US006997786B2

(12) United States Patent
Tchernov

(10) Patent No.: US 6,997,786 B2
(45) Date of Patent: Feb. 14, 2006

(54) METHOD OF PREPARING A SANDING BLOCK TO REPAIR A DAMAGED SURFACE PROFILE

(76) Inventor: Andrei Tchernov, 12644-71 Street NW, Edmonton, Alberta (CA) T5C 0L9

( * ) Notice: Subject to any disclaimer, the term of this patent is extended or adjusted under 35 U.S.C. 154(b) by 135 days.

(21) Appl. No.: 10/639,734

(22) Filed: Aug. 12, 2003

(65) Prior Publication Data

US 2004/0033770 A1    Feb. 19, 2004

(51) Int. Cl.
*B24B 1/00* (2006.01)
(52) U.S. Cl. .......................... 451/53; 451/28; 451/495; 451/524; 451/527; 451/913
(58) Field of Classification Search .................. 451/28, 451/7, 53, 56, 495, 523, 524, 526, 527, 530, 451/539, 913
See application file for complete search history.

(56) References Cited

U.S. PATENT DOCUMENTS 4,367,253 A * 1/1983 Hayes .......................... 428/75
4,535,574 A * 8/1985 Dettelbach et al. .......... 451/540
6,120,365 A * 9/2000 Johnson ....................... 451/495
6,283,842 B1 * 9/2001 Collins ......................... 451/495
6,443,825 B1 * 9/2002 Schadoffsky et al. ....... 451/344

FOREIGN PATENT DOCUMENTS

GB         2398259      * 10/2003

* cited by examiner

*Primary Examiner*—Eileen P. Morgan
(74) *Attorney, Agent, or Firm*—Davis & Bujold, P.L.L.C.

(57) ABSTRACT

A method of preparing a sanding block to repair a damaged surface profile. A first step involves finding an undamaged surface profile that matches the damaged surface profile. A second step involves providing a moulding block having a body with a flat surface surrounded by an upstanding flexible peripheral seal to form an enclosure. A third step involves filling the enclosure of the moulding block with hot melt adhesive and, with the hot melt adhesive still mouldable, pressing the moulding block against the undamaged surface profile until the hot melt adhesive solidifies to form a negative image of the undamaged surface profile. A fourth step involves removing the negative image formed of solidified hot melt adhesive from the undamaged surface profile for use as a sanding block.

21 Claims, 11 Drawing Sheets

METHOD OF PREPARING A SANDING BLOCK TO REPAIR A DAMAGED SURFACE PROFILE

FIELD OF THE INVENTION

The present invention relates to a method of preparing a sanding block to repair a damaged surface profile.

BACKGROUND OF THE INVENTION

Most automobiles have an exterior surface with either raised or recessed surface profiles. Raised surface profiles, such as outer ridges, are used to accent body lines. Recessed surface profiles, such as channels, are used to accommodate moulding attachments. Should the automobile sustain damage in the vicinity of one of it's surface profiles, such damage can be difficult to repair. One of the more difficult steps in the repair process is the step of sanding the filler material used for repair to restore the correct surface profile.

This problem exists in other fields, as well. It is common for furniture to be provided with decorative surface profiles. It is also common for doors, architectural mouldings, to have decorative surface profiles.

SUMMARY OF THE INVENTION

What is required is a method of preparing a sanding block to repair a damaged surface profile.

According to the present invention there is provided a method of preparing a sanding block to repair a damaged surface profile. A first step involves finding an undamaged surface profile that matches the damaged surface profile. A second step involves providing a moulding block having a body with a flat surface surrounded by an upstanding flexible peripheral seal to form an enclosure. A third step involves filling the enclosure of the moulding block with a mouldable chemical composition (such as hot melt adhesive) and, with the hot melt adhesive still mouldable, pressing the moulding block against the undamaged surface profile until the hot melt adhesive solidifies to form a negative image of the undamaged surface profile. A fourth step involves removing the negative image formed of solidified hot melt adhesive from the undamaged surface profile for use as a sanding block.

With the method, as described above, a unique negative image is created to be used as a sanding block for a unique surface profile.

Although beneficial results may be obtained through the use of the method, as described above, steps should be taken to protect surfaces which might be sensitive to the use of hot melt adhesives. Even more beneficial results may, therefore, be obtained when the undamaged surface profile is covered with a thin protective layer prior to the moulding block with hot melt adhesive being pressed against the undamaged surface profile. This protective layer can be masking tape, another form of tape, or a protective liquid coating.

When the negative image of solidified hot melt adhesive is large, it can be readily grasped. However, when the negative image of solidified hot melt adhesive is more delicate, some other means of grasping is required. Even more beneficial results may, therefore, be obtained when the negative image of solidified hot melt adhesive is mounted a support handle. One way that this can be done is with two sided tape.

Although beneficial results may be obtained through the use of the method, as described above, for large elaborate profiles it is preferred that the moulding block being of heat mouldable polymer foam. This enables the moulding block to be heat formed to better follow the contour of the undamaged surface profile, so that less hot melt adhesive is required.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

The preferred method of preparing a sanding block to repair a damaged surface profile will now be described with reference to FIGS. 1 through 12.

The preferred method includes the following steps.

Figure 1:
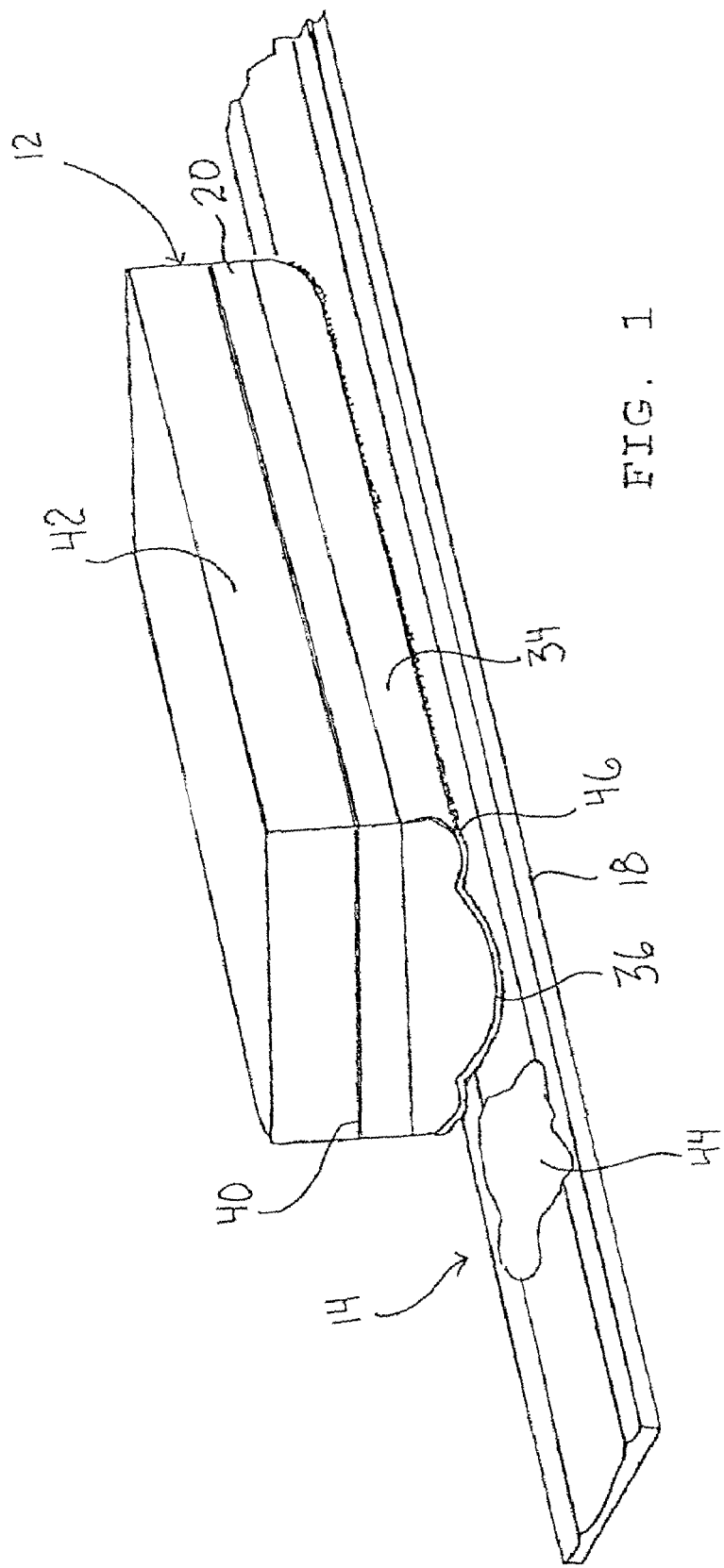
FIG. 1 is a perspective view of a sanding block prepared in accordance with the preferred method
Figure 2:
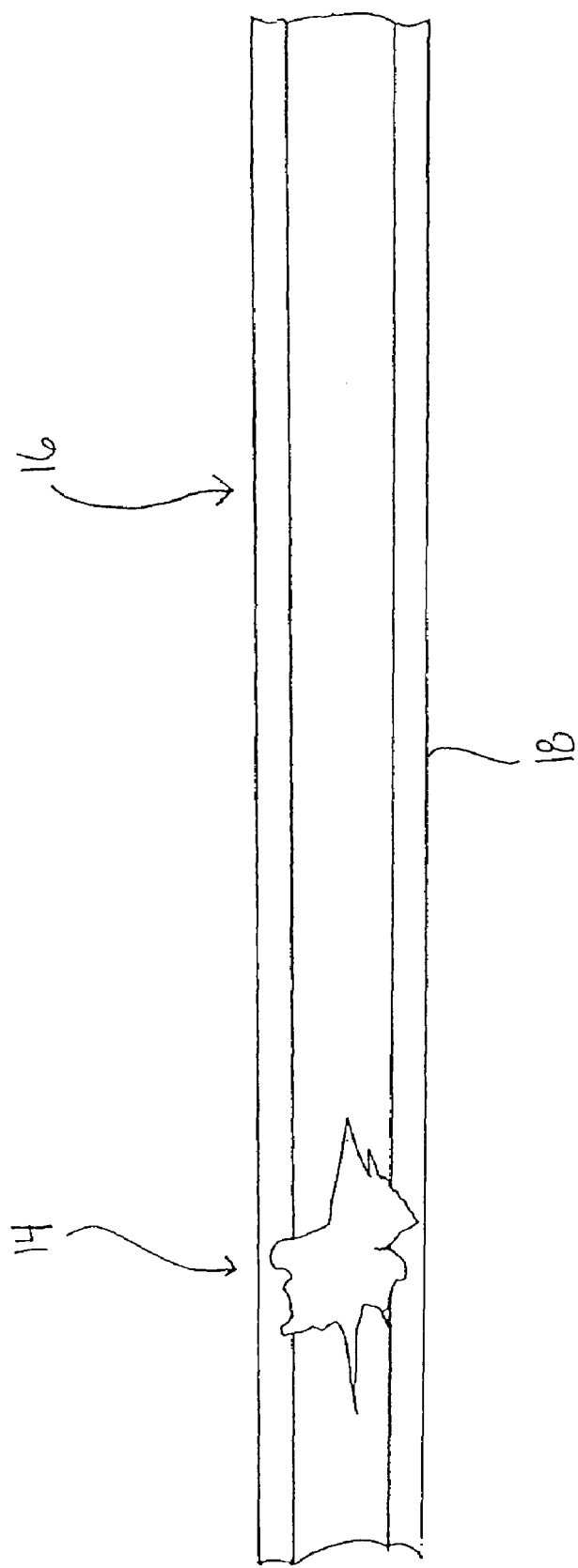
FIG. 2 is a top plan view of a surface with an undamaged surface profile and a damaged surface profile.

Referring to FIG. 1, there is method of preparing a sanding block 12 to repair a damaged surface profile generally referenced by numeral 14. Referring to FIG. 2, the preferred method involves finding an undamaged surface profile generally referenced by numeral 16 that matches damaged surface profile 14. In the illustrated embodiment, damaged surface profile 14 and undamaged surface profile 16 are located on the same portion of detailing trim 18 for a piece of furniture, however other types of surfaces with raised or indented profiles such as those found on autobodies or detailed mouldings for houses could also be repaired using the preferred method.

Figure 3:
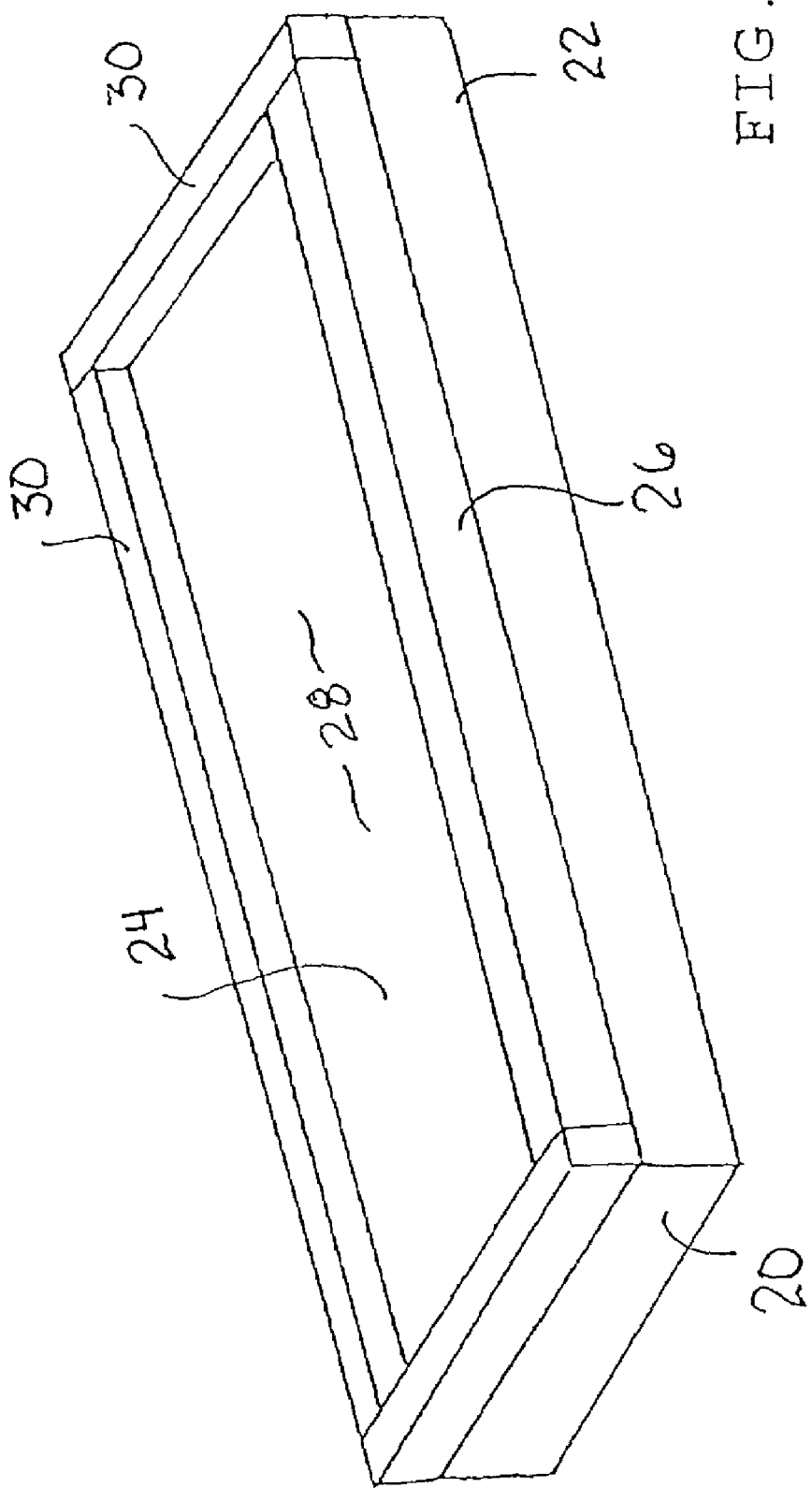
FIG. 3 is a perspective view of a moulding block of the sanding block illustrated in FIG. 1.
Figure 4:
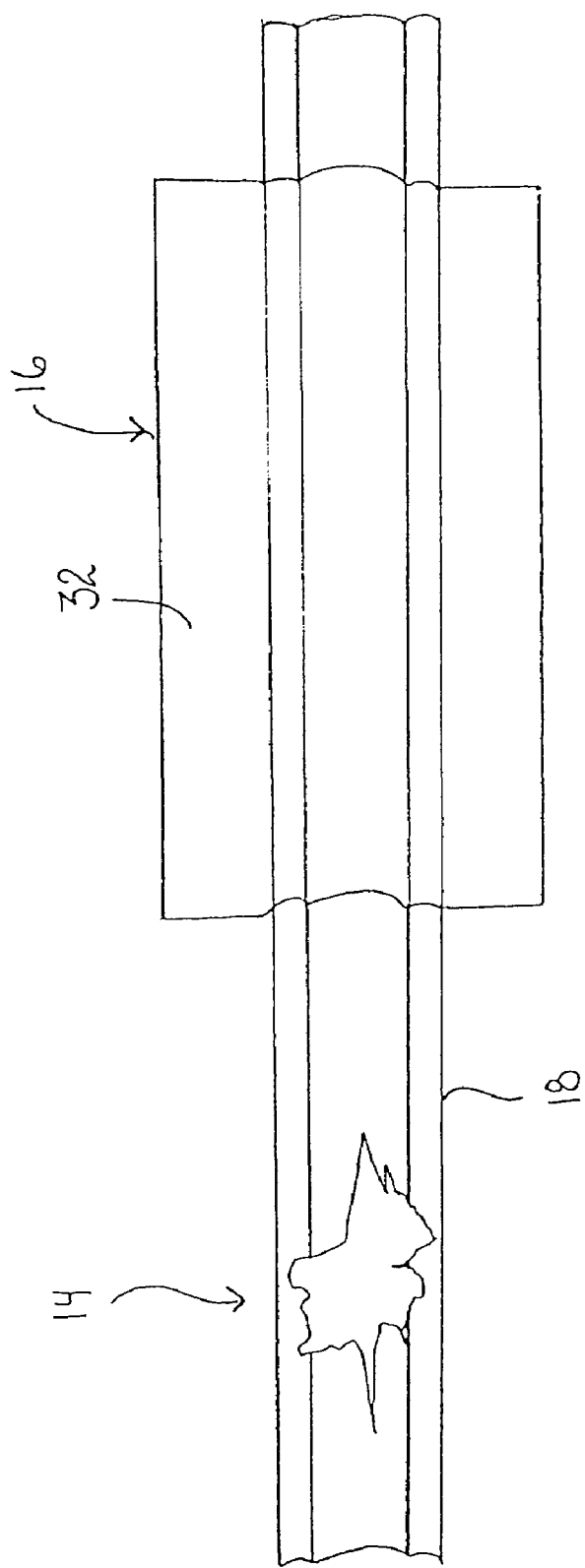
FIG. 4 is top plan view of the surface illustrated in FIG. 2 with the tape in place.

Referring to FIG. 3, a polymer foam moulding block 20 is provided that has a body 22 with a flat surface 24 surrounded by an upstanding flexible peripheral seal 26 which forms an enclosure 28. In the illustrated embodiment, peripheral seal 26 is formed from polymer foam strips 30 which can be peeled off flat surface 24 of body 22 at a later time, although it will be appreciated that peripheral seal 26 could be integral to body 22. Alternatively, polymer foam strips 22 could be permanent secured to body 22 and trimmed away as desired. Referring to FIG. 4, undamaged surface profile 16 is covered with a thin protective layer of masking tape 32. Masking tape 32 should be carefully smoothed onto undamaged surface profile to eliminating any air bubbles or wrinkles in tape masking tape 32. In the illustrated embodiment, masking tape 32 is illustrated as being used, however there are other ways to provide a thin protective layer including using a spray protector.

Figure 5:
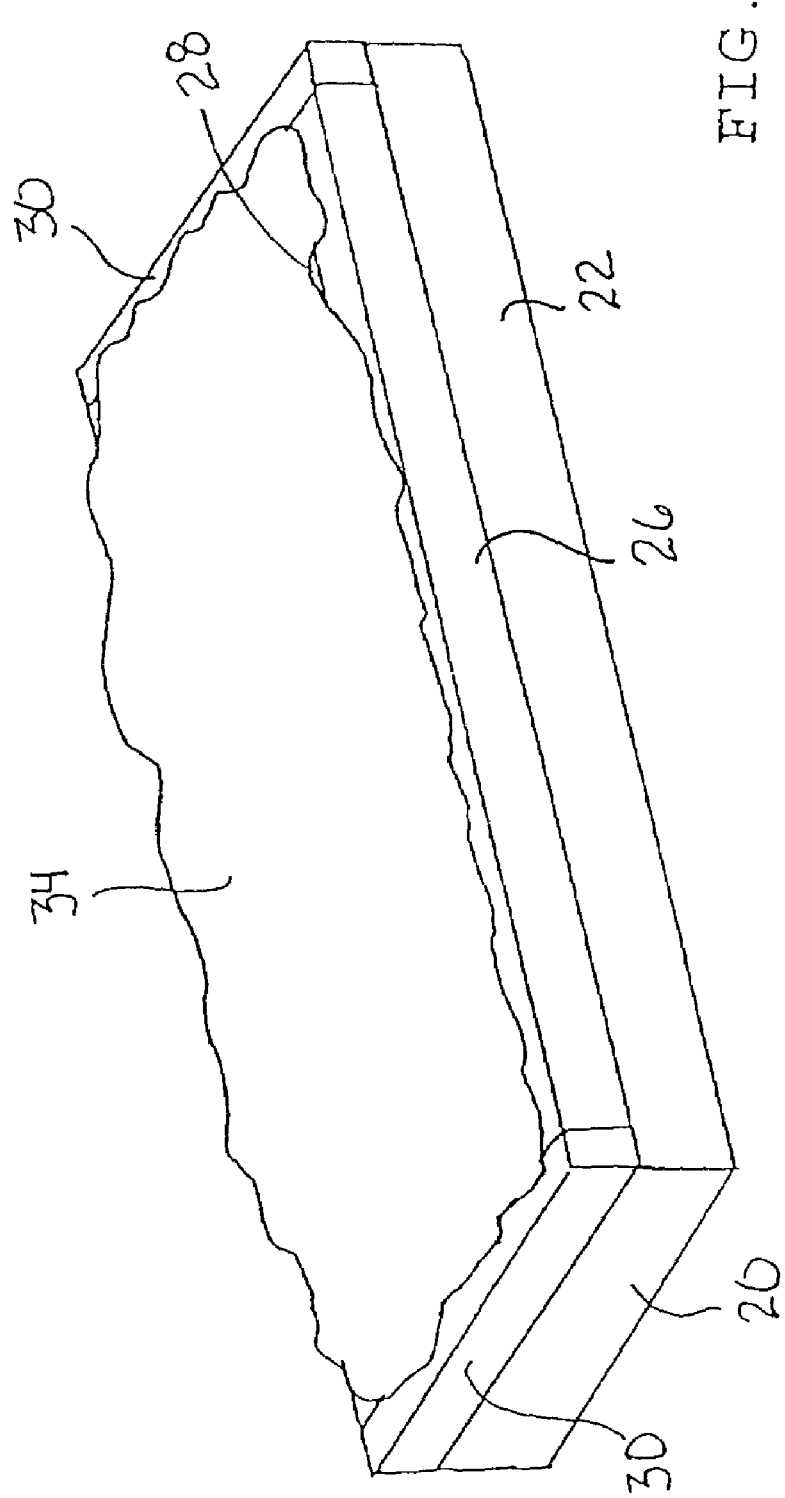
FIG. 5 is perspective view of the moulding block illustrated in FIG. 3 with filled with hot melt adhesive.
Figure 6:
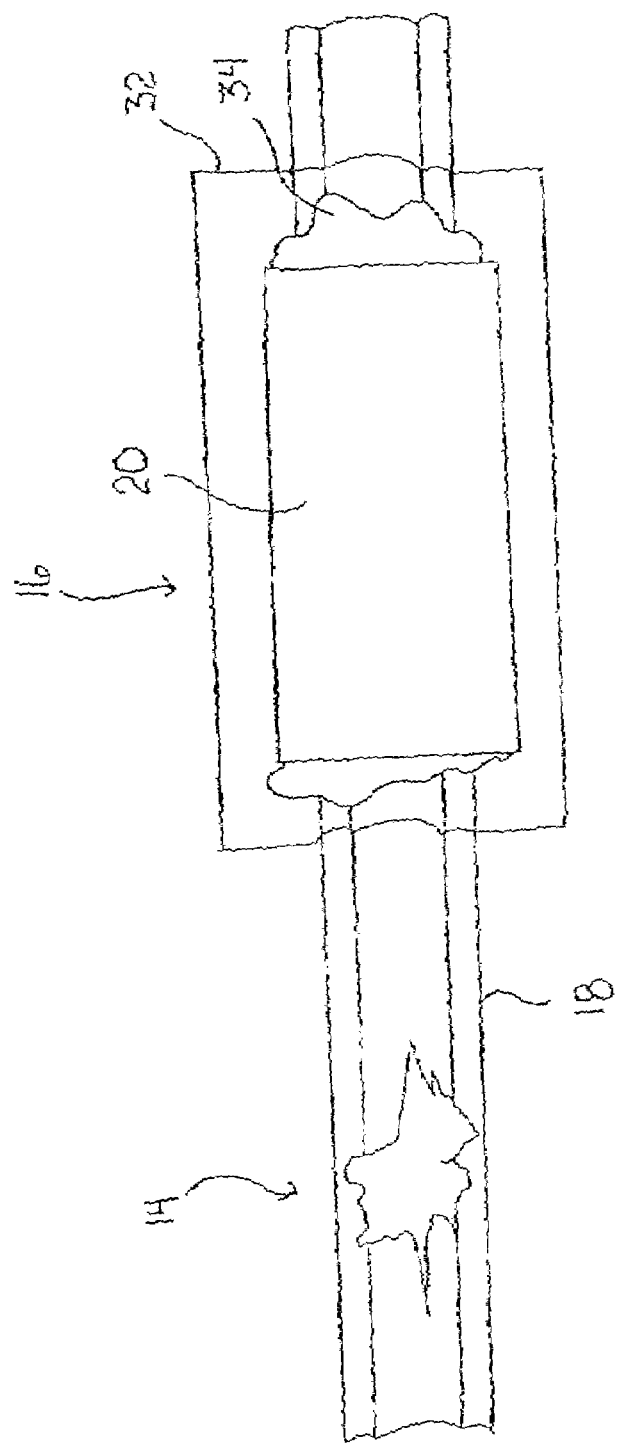
FIG. 6 is a top plan view of the moulding block being pressed into the surface illustrated in FIG. 4.

Referring to FIG. 5, enclosure 28 of moulding block 20 is filled with a mouldable chemical composition. At the present time the cheapest, fastest setting, and most readily available mouldable chemical composition known is hot melt adhesive 34. Referring to FIG. 6, with hot melt adhesive 34 still mouldable, moulding block 18 is pressed against undamaged surface profile 16 until hot melt adhesive 34 solidifies to form what can be termed a negative image or reverse image generally referenced by numeral 36 of undamaged surface profile 16 illustrated in FIG. 7. Negative image 36 that is formed of solidified hot melt adhesive 34 is removed from undamaged surface profile 16. If a surfactant (wet soap) is sprayed onto masking tape 32 prior to moulding block 18 with hot melt adhesive 34 being pressed against the surface, it has been found that it is easier to separate negative image 36 from masking tape 32. Solidified hot melt adhesive will adhere to flat surface 24 of body 22 of moulding block 18. Polymer strips 30 of upstanding flexible peripheral seal 26 which were used to form enclosure 28 can be removed to leave negative image 36 of solidified hot melt adhesive 34 spaced from moulding block. Excess solidified hot melt adhesive 34 can be trimmed off.

Figure 7:
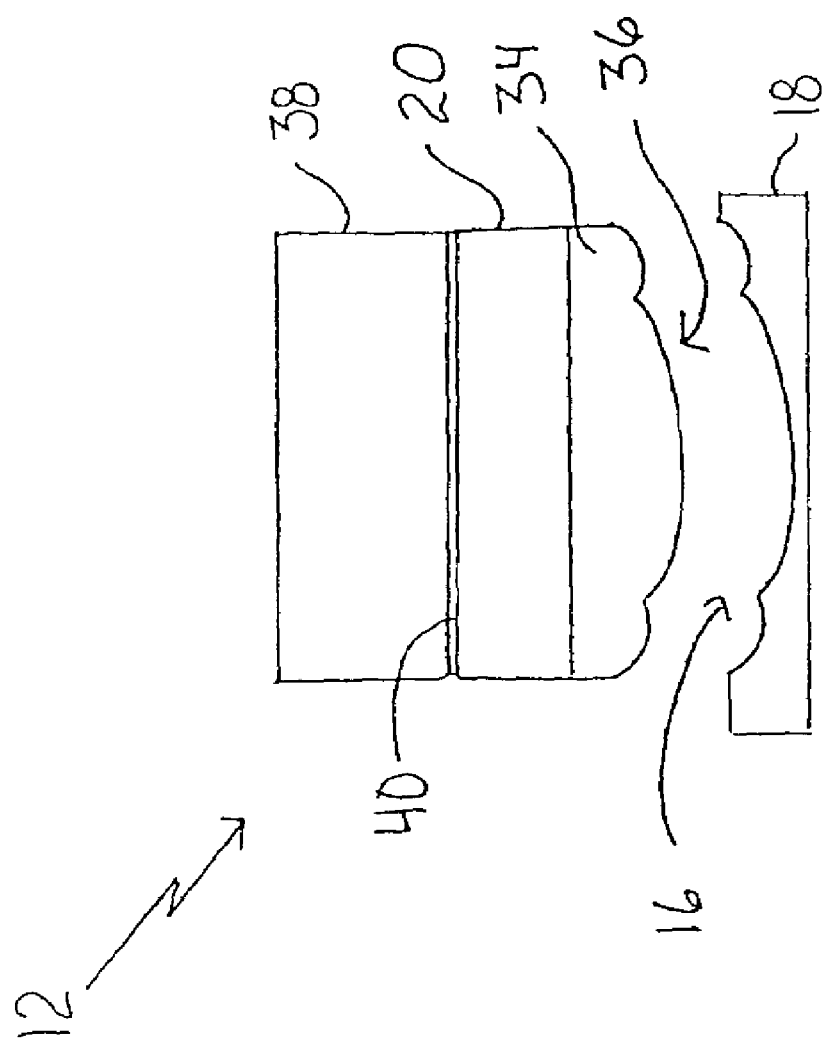
FIG. 7 is an end elevation view of the sanding block illustrated in FIG. 1.
Figure 9:
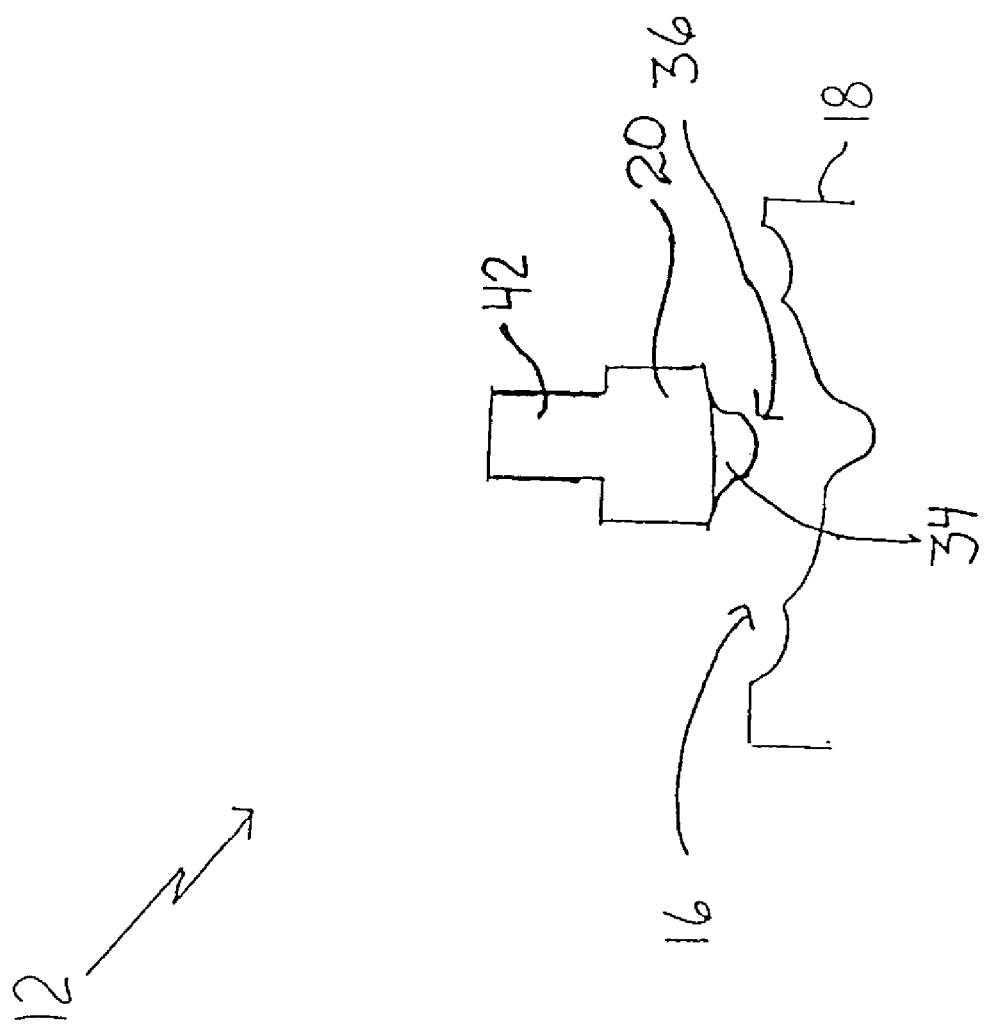
FIG. 9 is a perspective view of an alternative embodiment of sanding block prepared in accordance with the preferred method.

Referring to FIG. 7, negative image 36 of solidified hot melt adhesive 34 is mounted to a support handle 38 with two sided tape 40, although it will be appreciated that other methods (such as glue) can also be used to mount negative image 32 of solidified hot melt adhesive 30 to support handle 42. The preferred material for support handle 42 is foam, although other materials may also be used. Referring to FIG. 9, in instances where sanding block is very small, or where damaged surface profile that is being repaired is in an awkward place, moulding block 18 itself can be trimmed to form handle 42 rather than mount negative image 36 of solidified hot melt adhesive 34 to support handle 38 illustrated in FIG. 7.

Figure 8:
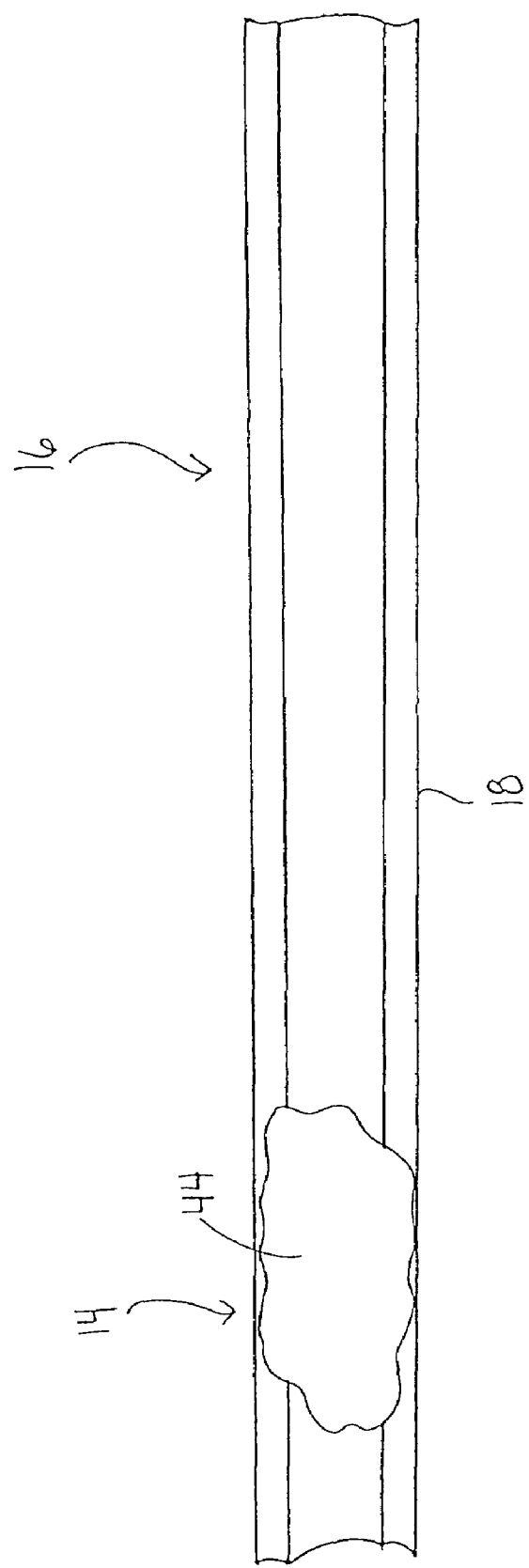
FIG. 8 is a top plan view of the surface illustrated in FIG. 2 with filler covering the damaged surface profile.

Referring to FIG. 8, filler material 44 is placed on damaged surface profile 14. Referring to FIG. 1, support handle 42 is grasped and excess filler material 44 is sanded from damaged surface profile 14 with sand paper 46 that is supported by negative image 36 of solidified hot melt adhesive 34.

Operation

The use of preferred method of preparing a sanding block to repair a damaged surface profile will now be described with reference to FIGS. 1 through 12. Referring to FIG. 1, sand block 12 which is prepared using the above described method can be used in a variety of applications including, the repair of damaged profiles on autobodies, furniture, and exteriors of housing. Moulding block 20 is made of heat mouldable foam and that can be heat formed to follow the contour of undamaged surface profile 16. This enables moulding block 12 to be customised to suit particular characteristics of damaged surface 14 that is to be repaired and also less hot melt adhesive 34 is required. Referring to FIG. 4, thin protective layer of masking tape 32 serves to protect undamaged surface profile from becoming stuck to or damaged by hot melt adhesive 34 during formation of negative image 36, especially since some hot melt adhesive 34 will escape form enclosure 28 during pressing onto undamaged surface profile 16. Care taken in carefully smoothing masking tape 32 onto undamaged surface eliminating air bubbles or wrinkles ensures that they will not become an unwanted part of negative image 36. After negative image 36 is formed, masking tape 32 can be easily removed from undamaged surface profile 16. Referring to FIG. 1, to facilitate sanding with larger sanding blocks 12 sand paper 46 is wrapped around and supported by sanding block 12. With smaller more delicate sanding blocks, a spray glue is sprayed directly onto negative image 36 and then grit is sprinkled onto the glue to create an abrasive surface that functions as sand paper.

Variations

Figure 10:
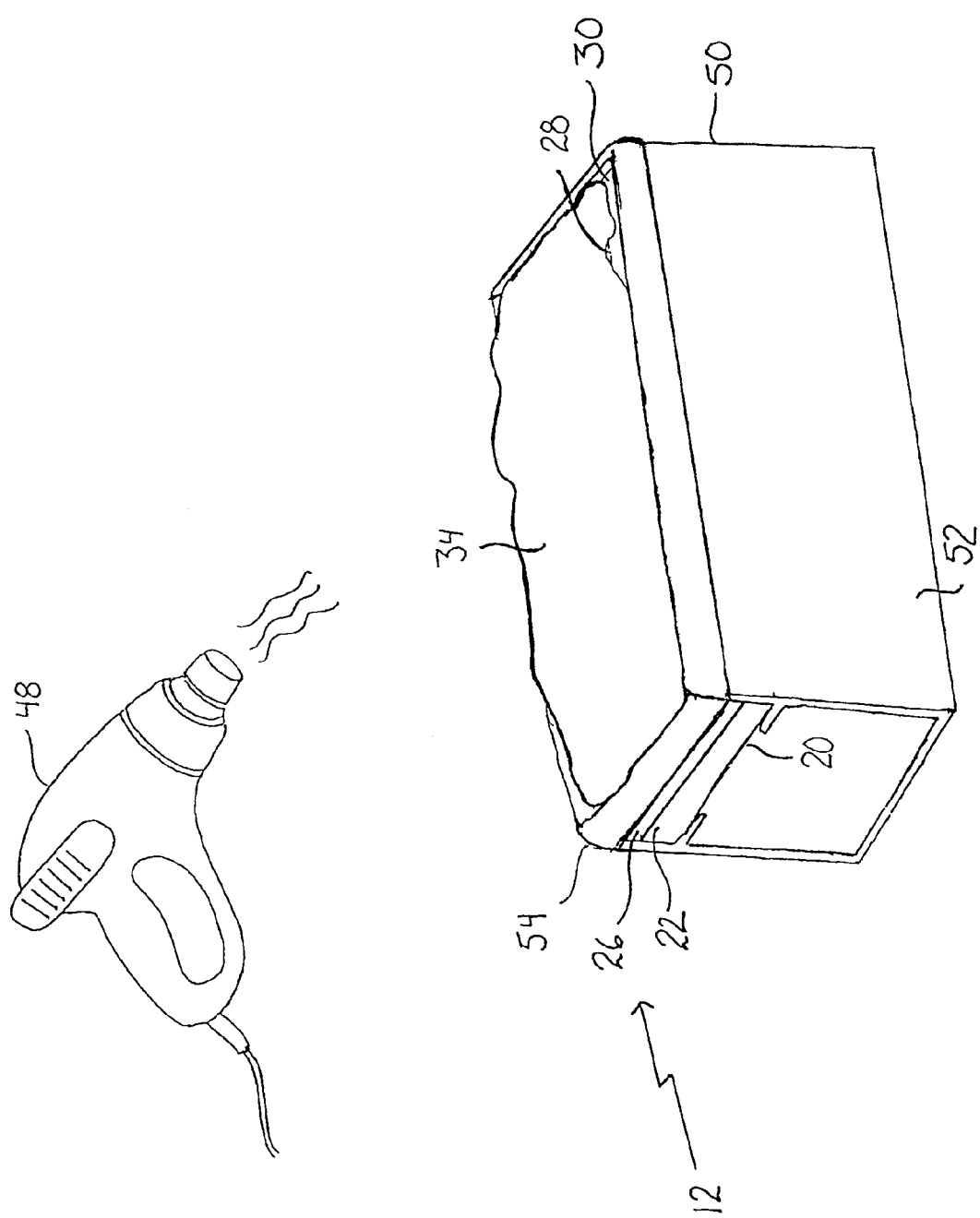
FIG. 10 is a perspective view of the moulding block which has been prepared in advance being heated with a heatgun.

Referring to FIG. 10, in the alternative, as a matter of convenience, moulding block 20 as described above, can be prepared in advance with enclosure 28 of moulding block 20 being filled with mouldable chemical composition and then moulding block 20 with solidified mouldable chemical composition can be stored until needed. In the illustrated embodiment, solidified mouldable chemical composition is hot melt adhesive 34, although it will be appreciated that other types of mouldable chemical compositions could also be used.

At the time of use, moulding block 20 is then heated with a heatgun 48 until solidified mouldable chemical composition becomes mouldable. In the instance where mouldable chemical is hot melt adhesive 34, hot melt adhesive 34 turns clear to indicate that it has melted. It should be noted that heat from heatgun 48 can damage polymer foam strips 30 so it is recommended that low heat setting be used.

An aluminium support handle 50 can be used to protect the users hands from burns during the process of heating moulding block 20 with heatgun 48. Aluminium support handle 50 overlies polymer foam moulding block 20 and provides a safe gripping surface 52 to avoid being burned.

Figure 12:
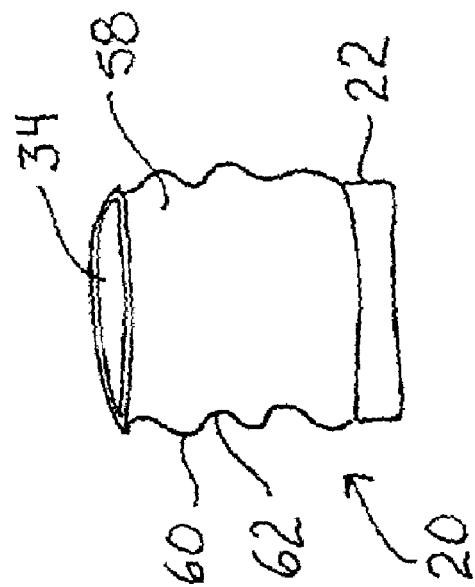
FIG. 12 is a is a perspective view of the moulding block with a peripheral seal of corrugated rubber tubing.
Figure 11:
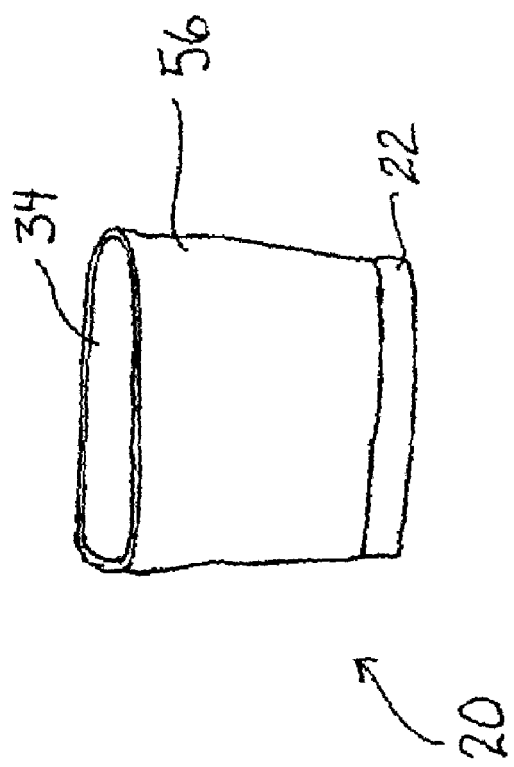
FIG. 11 is a perspective view of the moulding block with a peripheral seal of rubber tubing.

Furthermore, heat resistant tape 54, such as Teflon™ treated tape which can be heated to a temperature higher than the temperature required to melt hot melt adhesive 34, can be used to surround hot melt adhesive 34 during heating. Tape 54 can be used in conjunction with flexible peripheral seal 26 or as an alternative to flexible peripheral seal 26. Care should be taken to ensure that tape 54 does not inadvertently fold over into hot melt adhesive 34. Tape 54 serves to contain heated hot melt adhesive 34 during heating. Referring to FIG. 11, as an alternative to tape 54, rubber tubing 56 can also be used. Referring to FIG. 12, if desired, rubber tubing 58 or alternatively tape 56 illustrated in FIG. 10 can corrugated whereby it has alternating ridges 60 and grooves 62 that provide some additional flexibility during the moulding and imprinting process.

It will also be appreciated that moulding block 20 could be fabricated from other materials such as dry foam, which is a solid inflexible material. Where moulding block 20 is of a solid inflexible material, a spray or liquid is used as protective layer instead of masking tape 32 illustrated in FIG. 4. This is because moulding block 20 that is fabricated of solid inflexible material can only be pressed onto a profile and pulled off whereas moulding blocks 20 that are fabricated from flexible polymer foam can be rolled onto and pealed off of profile due to the flexibility of polymer foam.

Referring to FIG. 6, the use of moulding blocks 20 prepared in advance as illustrated in FIG. 10, is the same as with those moulding blocks 20 which are prepared at the time of use. While hot melt adhesive 34 still mouldable, moulding block 18 is pressed against undamaged surface profile 16 until hot melt adhesive 34 solidifies to form what can be termed a negative image or reverse image generally referenced by numeral 36 of undamaged surface profile 16 illustrated in FIG. 7. Negative image 36 that is formed of solidified hot melt adhesive 34 is removed from undamaged surface profile 16.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A method of preparing a sanding block to repair a damaged surface profile, comprising the steps of:
   finding an undamaged surface profile that matches the damaged surface profile;
   providing a moulding block having a body with a flat surface surrounded by an upstanding flexible peripheral seal to form an enclosure;
   filling the enclosure of the moulding block with a mouldable chemical composition, heating the moulding block until the mouldable chemical composition is in mouldable form, and pressing the moulding block against the undamaged surface profile until the mouldable chemical composition solidifies to form a negative image of the undamaged surface profile; and
   removing the negative image formed of solidified mouldable chemical compostion from the undamaged surface profile for use as a sanding block.

2. The method as defined in claim 1, the mouldable chemical composition being hot meld adhesive.

3. The method as defined in claim 1, the undamaged surface profile being covered with a thin protective layer prior to the moulding block with the mouldable chemical composition being pressed against the undamaged surface profile.

4. The method as defined in claim 1, the negative image of solidified mouldable chemical composition being mounted a support handle.

5. The method as defined in claim 1, the moulding block being of heat mouldable polymer foam and the moulding block is heat formed to follow the contour of the undamaged surface profile.

6. The method as defined in claim 4, the negative image of solidified mouldable chemical composition being mounted to the support handle with two sided tape.

7. The method as defined in claim 3, the protective layer being masking tape.

8. The method as defined in claim 1, including the further step of gluing grit onto the sanding block.

9. The method as defined in claim 1, including the further steps of:
   placing filler material on the damaged surface ridge; and
   sanding excess filler material from the damaged surface profile with sand paper supported by the sanding block made from the negative image of solidified hot melt adhesive.

10. A method of preparing a sanding block to repair a damaged surface profile, comprising the steps of:
    finding an undamaged surface profile that matches the damaged surface profile;
    providing a polymer foam moulding block having a body with a flat surface surrounded by an upstanding flexible peripheral seal to form an enclosure;
    covering the undamaged surface profile with a thin protective layer;
    filling the enclosure of the moulding block with hot melt adhesive and, with the hot melt adhesive still mouldable, pressing the moulding block against the undamaged surface profile until the hot melt adhesive solidifies to form a negative image of the undamaged surface profile; and
    removing the negative image formed of solidified hot melt adhesive from the undamaged surface profile for use as a sanding block;
    mounting the negative image of solidified hot nelt adhesive to a support handle
    placing filler material on the damaged surface ridge; and
    grasping the support handle and sanding excess filler material from the damaged surface profile with one of sand paper supported by the negative image of solidified hot melt adhesive or grit glued to said negative image.

11. The method as defined in claim 10, the moulding block being of heat mouldable foam and the moulding block being heat formed to follow the contour of the undamaged surface profile.

12. The method as defined in claim 10, the negative image of solidified hot melt adhesive being mounted to the support handle with two sided tape.

13. The method as defined in claim 10, the protective layer being masking tape.

14. A method of preparing a sanding block to repair a damaged surface profile, comprising the steps of:
    finding an undamaged surface profile that matches the damaged surface profile;
    providing a moulding block having a body with a flat surface surrounded by an upstanding flexible peripheral seal which forms an enclosure filled with a mouldable chemical compostion in solidified form;
    heating the moulding block until the mouldable chemical composition is in mouldable form;
    pressing the moulding block against the undamaged surface profile until the mouldable chemical composition solidifies to form a negative image of the undamaged surface profile; and
    removing the negative image formed of solidified mouldable chemical composition from the undamaged surface profile for use as a sanding block.

15. The method as defined in claim 14, the mouldable chemical composition being hot meld adhesive.

16. The method as defined in claim 14, the undamaged surface profile being covered with a thin protective layer prior to the moulding block with the mouldable chemical composition being pressed against the undamaged surface profile.

17. The method as defined in claim 14, wherein a heatgun is used to heat the moulding block until the solidified mouldable chemical composition becomes mouldable.

18. The method as defined in claim 14, wherein the upstanding flexible peripheral seal is heat resistant tape which can be heated to a temperature higher than a temperature required to melt the hot meld adhesive.

19. The method as defined in claim 14, wherein the upstanding flexible peripheral seal is corrugated to provide flexibility.

20. The method as defined in claim 14, wherein a heat resistant support handle is provided on the body of the moulding block.

21. The method as defined in claim 20, wherein the heat resistant support handle is aluminium.

* * * * *